Aug. 25, 1931.  F. W. SAMPSON  1,820,633
DRAG LINK
Filed July 22, 1929
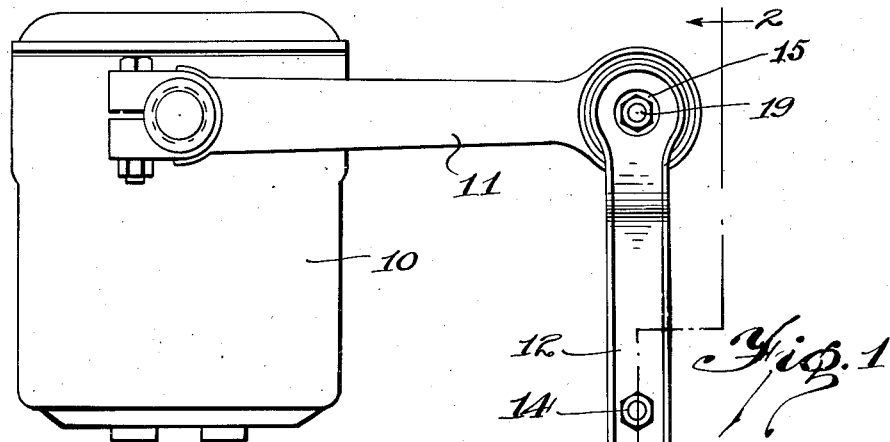
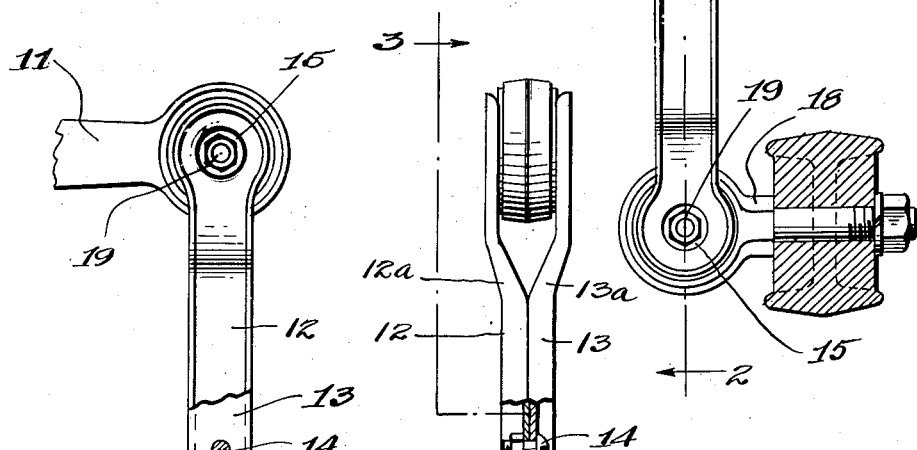
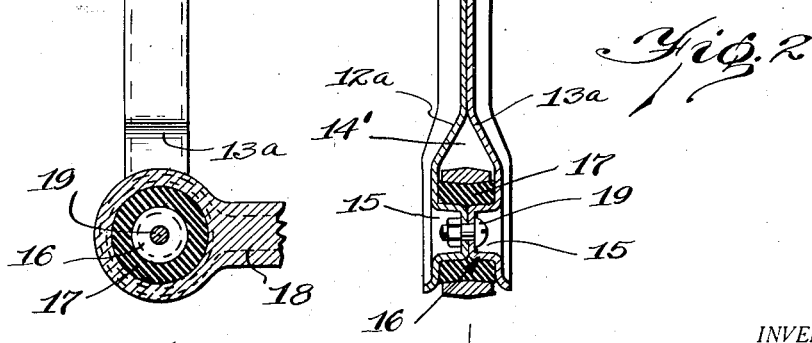
INVENTOR.
Frederick W. Sampson
BY
W. W. Harris
ATTORNEY.

Patented Aug. 25, 1931

1,820,633

UNITED STATES PATENT OFFICE

FREDERICK W. SAMPSON, OF DETROIT, MICHIGAN, ASSIGNOR TO CONTINENTAL MOTORS CORPORATION, OF DETROIT, MICHIGAN, A CORPORATION OF VIRGINIA

DRAG LINK

Application filed July 22, 1929. Serial No. 380,158.

This invention relates to drag links of the rigid type for connecting a plurality of machine elements or the like, and more particularly relates to drag links for attachment to shock absorbing devices.

It is an object of this invention to materially reduce the manufacturing and maintenance costs for producing drag links of the rigid type, by providing a simplified construction, that may be produced with a minimum of time and expense, and that may be readily and inexpensively repaired by providing means which permit worn out parts to be very easily and quickly replaced.

Another object of the invention is to facilitate the assembly of a drag link with a shock absorbing device or the like by providing a drag link constructed of a pair of complementary sections, that may be readily secured together and operatively connected to the said shock absorbing device or the like.

For a more detailed understanding of the invention, reference may be had to the accompanying drawings, which illustrate one form which the invention may assume, and in which:

Fig. 1 is a view in elevation of the improved drag link and operatively connected to a shock absorbing device.

Fig. 2 is a vertical sectional view taken substantially on the line 2—2 of Fig. 1, and Fig. 3 is a sectional view taken on the line 3—3 of Fig. 2.

The drag link herein illustrated, is preferably adapted for attachment to shock absorbing devices particularly of the double acting type. The shock absorbing device illustrated comprises a casing 10, in which the usual operating parts are assembled and connected with the operating arm 11, the said drag link being arranged to be attached to the arm.

The drag link consists of a pair of complementary channel shaped sheet metal sections 12 and 13, preferably formed of a stamping and secured together back to back by the bolt 14 or any other suitable fastening means. The extreme end portions of each section are offset, as at 12a and 13a, with respect to the plane of the main central portion of the respective drag link sections, in order to provide a yoke portion 14'. A spool portion bridges the gap between the arms of the yoke, and is preferably constructed by inwardly depressing a portion of each yoke arm, thereby forming the inwardly extending circular projection 15, the corresponding projections on each arm being arranged to abut for completing a spool 16.

A yielding ring 17, preferably constructed of rubber, encircles the spool 16 and provides a yielding bearing for a machine element, that is adapted to be connected therewith. One end of the link is connected to the arm 11 carried by the shock absorbing device, and the other end of the link is connected with a special fixture 18 attached to a portion of the vehicle frame. A bolt 19 is inserted through perforations in the bottom of the depressed projections 15 and secures the two sections 12 and 13 together at the ends, and at the same time clamps the rubber ring 17 in place, together with the machine element to which the drag link is to be connected.

It will be noted, that the several parts of the drag link may be readily and quickly assembled together and also very readily attached to the associated machine elements, to which the said drag link is connected. Furthermore, the machine elements connected therewith may have a slight swivelling action because of the yielding character of the rubber ring bearing.

In addition, these rubber ring bearings may be economically and readily replaced when they become worn. It will be noted, that the necessity of providing adjustable means for taking up wear is thus eliminated, as the yielding bearing will readily accommodate itself to the machine element supported thereby, and should the bearing become worn to such an extent as to allow an excessive amount of play, the worn out rubber ring bearing may be replaced with a new one.

It may be further noted, that the drag link is constructed of a minimum number of parts, the several parts being of such a design, that the same can be economically manufactured and serviced.

Although but one form of the invention has been illustrated and but a single application thereof has been described in detail, it will be apparent to those skilled in the art to which the invention pertains, that various modifications and changes may be made therein without departing from the spirit of the invention or from the scope of the appended claims.

What I claim as my invention is:

1. A drag link, comprising a pair of complementary sheet metal sections secured together and constructed to form complemental spool portions adjacent the end thereof which when assembled together provide a pivotal support to which a machine element may be connected.

2. A drag link, comprising a pair of complementary sheet metal sections secured together back to back, the end portions of said sections being spaced apart to form a yoke at each end of said drag link, and a spool member for bridging the gap between the spaced end portions to provide a support to which a machine element may be connected.

3. A drag link, comprising a pair of complementary sheet metal sections secured together back to back, the end portions of said sections being spaced apart to form a yoke at the ends thereof, and a punched out spool portion for bridging the gap between the spaced end portions to provide a support to which a machine element may be connected.

4. A drag link, comprising a pair of complementary sheet metal sections secured together and provided with a spool member at one end thereof, and a yielding bearing ring encircling said spool member and secured thereon.

5. A drag link, comprising a rigid link member provided with a yoke portion at one end thereof and with a support bridging the gap between the arms of said yoke, and a yielding ring encircling said support and secured thereon.

6. A drag link, comprising a pair of complementary sheet metal link sections secured together and each provided with a portion adjacent one end offset with respect to the plane of the body of said link section to provide a yoke portion, a spool member for bridging the gap between the arms of said yoke, and a yielding ring encircling said spool member and clamped thereon.

7. A drag link, comprising a pair of complementary sheet metal link sections secured together and each provided with a portion adjacent one end offset with respect to the plane of the central body portion of said link section to provide a yoke portion, a spool member for bridging the gap between the arms of said yoke constructed by punching out inwardly extending projections from the arms of said yoke portions, and a yielding rubber ring encircling said spool member and clamped thereon.

In testimony whereof I affix my signature.

FREDERICK W. SAMPSON.